(No Model.)

E. L. SLOCUM.
GALVANIC BATTERY.

No. 555,056. Patented Feb. 18, 1896.

WITNESSES:
Harry J. Giveau
James W Benman

INVENTOR:
Eason L. Slocum
By S. Scholfield
ATTY.

UNITED STATES PATENT OFFICE.

EASON L. SLOCUM, OF PAWTUCKET, RHODE ISLAND.

GALVANIC BATTERY.

SPECIFICATION forming part of Letters Patent No. 555,056, dated February 18, 1896.

Application filed July 2, 1894. Serial No. 516,352. (No model.)

*To all whom it may concern:*

Be it known that I, EASON L. SLOCUM, a citizen of the United States, residing at Pawtucket, in the State of Rhode Island, have invented a new and useful Improvement in Galvanic Batteries for Operating Electric Lamps, of which the following is a specification.

My invention consists in the improved construction and arrangement of the parts of the battery as hereinafter fully set forth.

Figure 1:
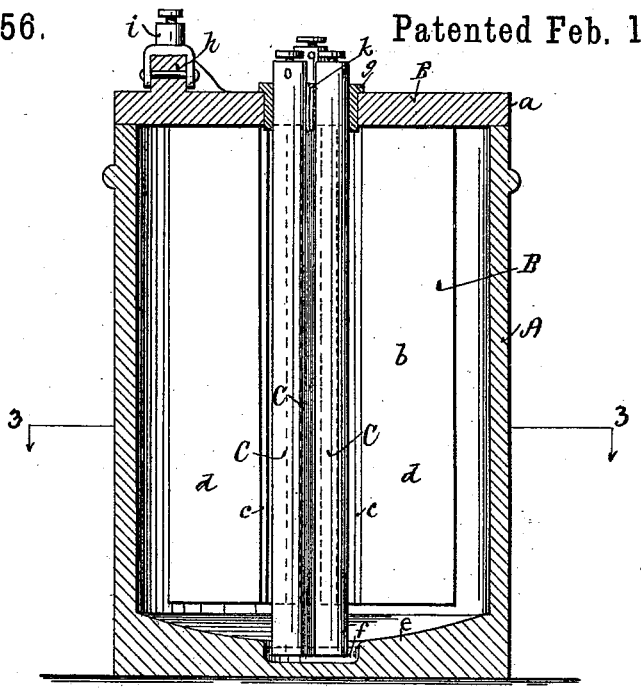
Figures 2, 3:
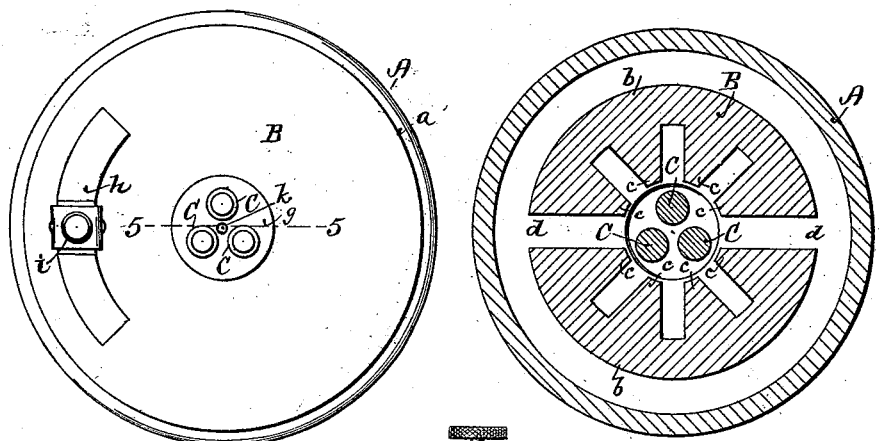
Figure 4:
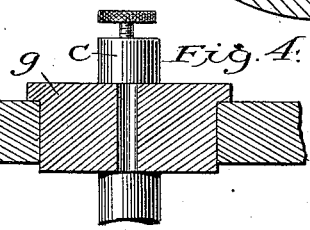

In the accompanying drawings, Figure 1 represents a vertical section of a galvanic battery provided with my improvement. Fig. 2 represents a top view of the same. Fig. 3 represents a transverse section taken in the line 3 3 of Fig. 1. Fig. 4 represents an enlarged detail vertical section taken in the line 5 5 of Fig. 2.

In the drawings, Figs. 1 and 2, A represents the glass jar for the battery-cell, B the carbon or negative electrode, and C C C the plurality of positive electrodes. The carbon electrode B is provided with the flange $a$, which forms a cover for the jar A, and with the downwardly-extending semiannular portions $b\ b$, separated from each other by means of the vertical passage $d$, each of which portions is provided with the inwardly-directed ribs $c\ c$. The bottom $e$ of the jar is made in concave form and provided centrally with the shallow well $f$, adapted for the reception of quicksilver, (shown by dotted line in Fig. 1,) by means of which the positive electrodes C C C will be automatically amalgamated, the lower ends of the said electrodes being made to extend downward into the well $f$, the guiding sides of the well $f$ serving to prevent the accidental contact of the zinc electrode with the surrounding carbon electrode, as shown in the drawings, and the upper ends of the zinc electrodes made to extend upward through the insulator $g$, made of hard rubber or other suitable material. The carbon electrode B is provided with the boss $h$, to which is secured the binding-post $i$.

In order to prevent undue corrosion of the zinc electrodes C C C by the acid fumes arising from the solution, the insulator $g$ is provided with the central perforation $k$, through which the rising fumes will escape, thus keeping the battery in good working condition, and the said perforation $k$ will provide an opening through which the quicksilver may be supplied to the well $f$ without requiring the removal of the parts of the battery, the zinc electrodes being arranged around the said perforation.

I claim as my invention—

1. In a galvanic battery, the combination of the negative electrode provided with the flange, the downwardly-extending semiannular portions separated from each other by the vertical passage, and with the internal ribs, with the jar, provided with the quicksilver-well extending abruptly below the surface of the surrounding outer portion of the bottom of the jar, and the positive electrodes extending downward into the well, substantially as described.

2. In a galvanic battery, the jar provided at its bottom with the quicksilver-well extending abruptly below the surface of the surrounding outer portion of the bottom of the jar, which outer portion inclines downwardly from the wall of the jar to the well, substantially as described.

3. In a galvanic battery, the combination of the insulator provided with a central opening, with the plurality of positive electrodes arranged around the said opening, and the well for quicksilver, at the bottom of the jar, under the said opening in the insulator, substantially as described.

4. In a galvanic battery, the combination of the jar provided at its bottom with a well for the quicksilver, with the positive and negative electrodes, and the insulator, provided with a perforation over the well, whereby the well may be filled with quicksilver without disturbing the parts of the battery, substantially as described.

EASON L. SLOCUM.

Witnesses:
SOCRATES SCHOLFIELD,
HARRY J. GARCEAU.